United States Patent
Nagaraj

(10) Patent No.: US 9,645,901 B2
(45) Date of Patent: May 9, 2017

(54) ACCELERATING APPLICATION WRITE WHILE MAINTAINING HIGH AVAILABILITY IN SHARED STORAGE CLUSTERS

(71) Applicant: CacheBox Inc., San Carlos, CA (US)

(72) Inventor: Murali Nagaraj, Pune (IN)

(73) Assignee: PrimaryIO, Inc., San Carlos, CA (US)

( * ) Notice: Subject to any disclaimer, the term of this patent is extended or adjusted under 35 U.S.C. 154(b) by 37 days.

(21) Appl. No.: 14/659,773

(22) Filed: Mar. 17, 2015

(65) Prior Publication Data

US 2015/0261634 A1    Sep. 17, 2015

Related U.S. Application Data

(60) Provisional application No. 61/953,997, filed on Mar. 17, 2014.

(51) Int. Cl.
*G06F 11/07* (2006.01)
*G06F 11/20* (2006.01)

(52) U.S. Cl.
CPC ...... *G06F 11/2046* (2013.01); *G06F 11/2038* (2013.01)

(58) Field of Classification Search
CPC ............. G06F 11/3037; G06F 11/2046; G06F 12/0868
USPC .......................................................... 714/6.3
See application file for complete search history.

(56) References Cited

U.S. PATENT DOCUMENTS

| | | | | |
|---|---|---|---|---|
| 8,904,117 B1* | 12/2014 | Kalekar | ............... | G06F 12/0804 711/119 |
| 2012/0131038 A1* | 5/2012 | Aronovich | .......... | G06F 11/1435 707/769 |
| 2014/0059292 A1* | 2/2014 | Phelan | ................ | G06F 12/0866 711/113 |
| 2014/0359229 A1* | 12/2014 | Cota-Robles | ........... | G06F 9/455 711/143 |
| 2015/0074448 A1* | 3/2015 | Ageishi | ............... | G06F 11/2007 714/4.11 |
| 2015/0081979 A1* | 3/2015 | Banta | .................. | G06F 12/0804 711/135 |

* cited by examiner

*Primary Examiner* — Chae Ko

(57) ABSTRACT

An embodiment of the invention provides a method comprising: performing an application write; storing the application write in a local cache; performing a system call to request an underlying storage system to persist any application writes that are not yet persisted; and in response to the system call, copying the application write in the cache to a shared permanent storage. In another embodiment of the invention, an apparatus comprises: an application configured to perform an application write; a cache software configured to store the application write in a local cache; wherein the application is configured to perform a system call to request an underlying storage system to persist any application writes that are not yet persisted; and in response to the system call, the cache software is configured to copy the application write in the cache to a shared permanent storage.

9 Claims, 3 Drawing Sheets

… …

ACCELERATING APPLICATION WRITE WHILE MAINTAINING HIGH AVAILABILITY IN SHARED STORAGE CLUSTERS

CROSS-REFERENCE(S) TO RELATED APPLICATIONS

This application claims the benefit of and priority to U.S. Provisional Application 61/953,997, filed 17 Mar. 2014. This U.S. Provisional Application 61/953,997 is hereby fully incorporated herein by reference.

FIELD

Embodiments of the invention relate generally to data storage systems.

DESCRIPTION OF RELATED ART

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against this present disclosure.

A data storage system may be formed by a multi-node cluster which includes multiple servers that are connected to a shared storage device (e.g., a shared hard disk drive or HDD). FIG. 1 is a block diagram of a typical 2-node cluster which includes two servers with a highly available configuration and are connected to a shared storage. This 2-node cluster is typical of banking applications which need to be highly available to users. The components in this 2-node cluster are the server1 104 which is designated as the active node and server2 105 which is designated as the standby node. The server1 104 includes the active application instance 101 which in this example is a database application, and storage software 102. The server2 105 includes the application instance 106 and storage software 107. The server1 104 and server2 105 are connected to a shared storage 103 which may be, for example, a hard disk drive (HDD) 103.

If any component (e.g., application 101 and/or storage software 102) develops a fault, the service is failed over from server1 104 to server2 105, since the data is stored on the shared storage 103 and is also accessible by the server2 105, and the service resumes without data loss.

Application writes 501 are serviced by the storage software 102, while application writes 503 are serviced by the storage software 107. If the writes 501 are random in natures, the shared storage 103 takes longer to service the requests 502 (from server1 104) which hurts or degrades application performance. Similarly, after fail over has occurred, the server2 105 can send requests 504 to the shared storage 103.

While the above-noted system is suited for its intended purpose(s), there is a continuing need for reliable data storage systems.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

An exemplary embodiment of the invention provides an apparatus and method for accelerating application writes while maintaining high availability in shared storage clusters are disclosed.

Figure 1:
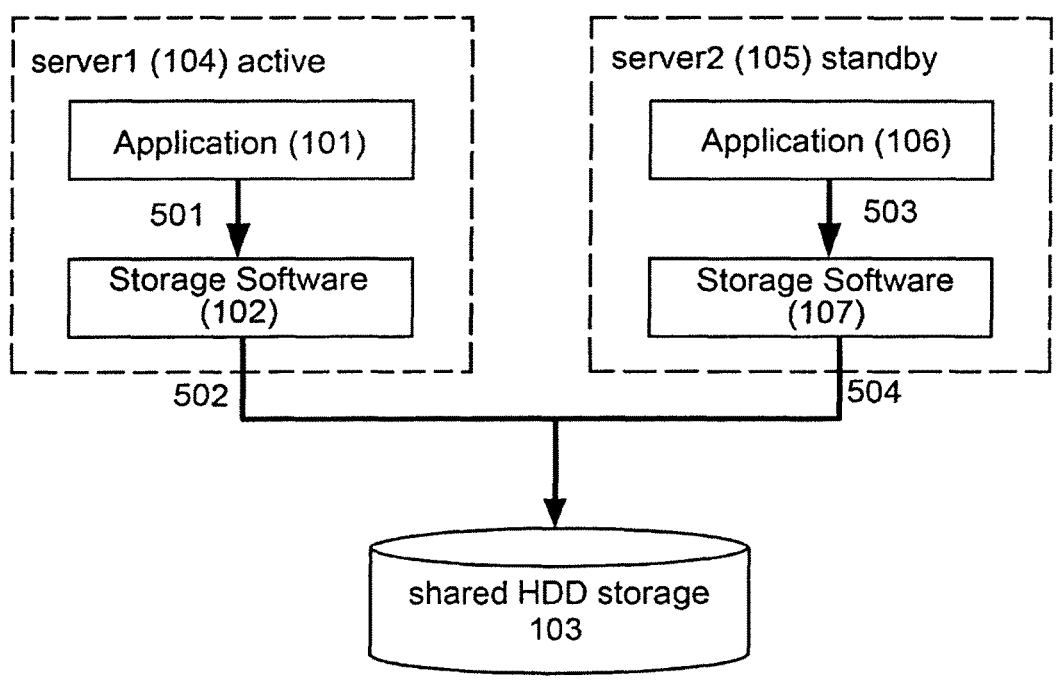
FIG. 1 is a block diagram of a typical 2-node cluster that is provided by conventional technology.
Figure 2:
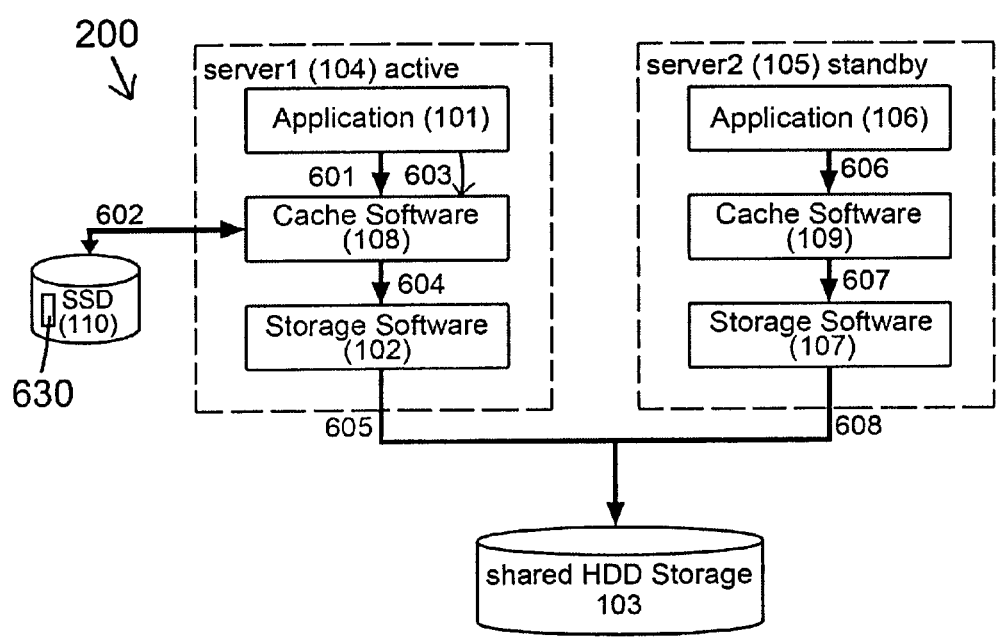
FIG. 2 is a block diagram of an apparatus in accordance with an embodiment of the invention.

FIG. 2 is a block diagram of an apparatus 200 (data storage system 200) in accordance with an embodiment of the invention. The system 200 is shown as an example 2-node cluster which includes two servers (104 and 105)

with a highly available configuration and are connected to a shared storage 103. However, embodiments of the invention may also provide a system 200 with more than two servers that are connected to the shared storage 103. The components in this 2-node cluster are the server1 104 which is designated as the active node and server2 105 which is designated as the standby node. The server1 104 includes the active application instance 101 which may be, for example, a database application, and storage software 102. The server1 104 also includes a cache management software 108 that permits the server1 104 to communicate with a cache 110 that is locally attached (or communicatively coupled by another configuration) to the server1 104 and server2 105 and that provides various functionalities in embodiments of the invention to be discussed below. In one embodiment, the cache 110 is a solid state storage device (SSD) or another type of cache. The cache 110 may be a single storage device, a plurality of storage devices, or an aggregate of a plurality of storage devices.

The server2 105 includes the application instance 106 and storage software 107. The server2 105 also includes a cache management software 109 that permits the server2 105 to communicate with the cache 110 when there is a fail over from the server1 104 to the server2 105. The cache management software 108 and cache management software 109 may be similar in functionalities.

The server1 104 and server2 105 are connected to a shared storage 103 which may be, for example, a permanent storage device such as, for example, a hard disk drive (HDD) 103 or another type of shared storage 103 such as, for example, a SCSI drive, a RAID array of storage devices, another type of storage device, or another type of a configuration of storage devices.

In accordance with an embodiment of the invention, the application 101 performs application writes 601 that are serviced by the cache management software 108. The cache software 108 stores 602 the application writes 601 to a locally attached cache 110 which is typically a high performance storage device.

Application 101 performs a request (system call) 603 to the underlying storage systems (e.g., filers, Operating System stacks, and underlying storage subsystems) in the server1 104 to make the preceding writes 601 to be durable (remain in the same state even after a power down occurrence). Such a request 603 is typically an fsync system call 603 or fdatasync system call 603. Therefore, the system call 603 will request the underlying storage systems to persist any application writes 601 that are not yet persisted.

Persistent data (or application writes 601 that has persisted as discussed herein) is defined as data that is stored on non-volatile storage. Historically, persistent data access has been expensive due to the slow nature of hard disk drives and tapes. Typically, applications use RAM (random access memory) to "buffer" persistent data. Buffering is defined as (in this context of a RAM buffering persistent data) for any new data that is generated, e.g., a user transaction, then that new data is first stored in RAM and is committed to persistent storage along with other transactions in a batch at a later point in time.

Most applications running on POSIX compliant operating systems use a well defined OS interface, such as the fsync system call, in order to request the underlying storage systems to persist any data which is not yet persisted. The knowledge of application commit frequency (which provides the timing information for system calls 603) can be determined by inspecting the application configuration. For example, for an application instance MySQL, the application configuration stores the commit settings in the my.cnf configuration file.

An example of an operation in apparatus 200 is now discussed. Consider an application 101 like Oracle Database issuing table updates and other queries resulting in IO 601. This IO is random in nature and requires a very expensive high performance storage 103. This example storage 103 despite being high performance is typically not good enough to cater to the IO requirements of Oracle Database.

The Cache software 108 intercepts these queries and table updates issued by Oracle Database at the IO subsystem level. These IOs are intended for storage 103. The intercepted IOs are then stored in the high performance local attached flash device 110. The organization of the data format 630 is such that data is efficiently stored, retrieved and released back to the flash controller. The flash cache 110 is organized as a transactional log which enables the caching software 108 to store and retrieve not just efficiently but also release space back to the flash controller without any data loss.

In the event of an fsync call, the dirty data (a.k.a., e.g., cached data such as data 630) is quickly retrieved from the cache 110 without requiring expensive search of the cache 110. This is again due to the organization of the cache storage (a.k.a the persistent layout of the cache 110). Once the data is quickly retrieved, in a piece wise manner, the same data is copied back to the primary storage 103 in large chunks, and sequenced such that the disk bandwidth is efficiently utilized resulting in overall high performance levels.

When an application 101 issues write calls and/or read calls, the application 101 will also issue an fsync (or fdatasync) system call 603 to the underlying storage subsystems. In response to the system call 603, the cache management software 108 copies (605) the application writes 602 (stored in the cache 110) to the shared storage 103. In an embodiment of the invention, this copy operation 605 is performed in an optimal fashion by involving, for example, sequential IO (input or output) calls, so that the cache software 108 sequentially copies the application writes 602 from the cache 110 to the shared storage 103.

In another embodiment of the invention, as another optimization, the cache software 108 may aggressively (or immediately) issue copyback writes 605 (of application writes 601 stored in the cache 110) to the shared storage 103 to ensure quick response times for the system calls 603. A quick copyback operation 605 advantageously avoids the need for expensive network transfers or replications. As known to those skilled in the art, a copyback write is an operation in which data previously read from a cache is written back to a permanent storage, such as the shared storage 103.

An example of a copyback write is as follows. The cache 630 has stored dirty blocks 1, 7, 10, 11, 12, 17 and the incoming IO stream due to application activity results in the following IO stream having blocks 2, 3, 4, 22, and FSYNC, 15, 18. At this point, the caching software 108 will detect the FSYNC in the IO stream and organize the IO stream to the external storage 103 in a queue as follows: blocks 1, 2, 3, 4, 7, 10, 11, 12, 17, 22, and FSYNC. It should be noted that the new application IOs and the cached IOs are intermixed in a sequential/sorted manner (notice the ordering of the blocks). This ordering results in optimal storage performance of storage 103.

Copyback writes are organized in a queue along with other IOs in the system which are not being serviced out of the cache. These IOs are then processed in a batch and submitted to the underlying storage subsystem. The IOs are especially tagged to indicate to the underlying storage subsystem as a batch of IOs and the underlying subsystem should hold off processing until the complete batch is received. At the end of the batch processing, the drive is informed accordingly. Such mechanisms to inform the driver exists, for instance the plug/unplug mechanism in Linux is an example.

In an event of a failure of one or more components in the server1 104 before a system call 603 is issued, the recent application writes 601 are not available on the shared storage 103. However, the application 101 can recover these application writes 601 as follows. The application cannot recover the 601 writes at the failover site. But that is acceptable because it is not indicated an intention (603) to make data durable. It is therefore in a position to recover from a crash without any consistency issues. Some small data loss may occur but that is the same as a crash without involving caching.

In the event of a failure of one or more components in the server1 104 after a system call 603, the recent application writes 601 (and other data) are available on the shared storage 103 for the standby server2 105. Since the cache software 108 has copied 605 (or has performed a copyback write 605 of) the application writes 602 to the shared storage 605, the recent writes 602 are available on shared storage 103. After the fail over operation is performed, the server2 105 can read 608 from or write 608 to the shared storage 103. Thus, the cache management software 108 has preserved the failure consist of the application 101 and at the same time boosted the performance of the application 101.

Between two system calls 603, the cache management software 108 cached the application writes 602 and the cache management software 108 has copied 605 these application writes 602 to the shared storage 103, so that the server2 105 will be able to access the same data in the shared storage 103 that was written by the server1 104 to the cache 110 prior to the fail over operation.

In another embodiment of the invention, the cache management software 108 is also configured to perform dirty writes to dirty buffers 630 in the cache 110. As known to those skilled in the art, a dirty write is a technique of writing to storage of only those portions of system state that have been modified (are dirty) since their last write. Sophisticated document editing applications, for example, will use dirty writes to save only those portions of a document that were actually changed since the last save. The cache management software 108 can optimize the dirty write stream from the cache 110 to the shared storage 103 by sorting and/or other scheduling copy techniques in order to minimize the time required for copyback.

In contrast, in conventional systems, data is replicated to all standby nodes during a fail over operation. However, replication of data is an expensive network operation that disadvantageously requires many complex software components and data coordination and failure consistencies algorithms and/or is a time consuming operation.

Figure 3:
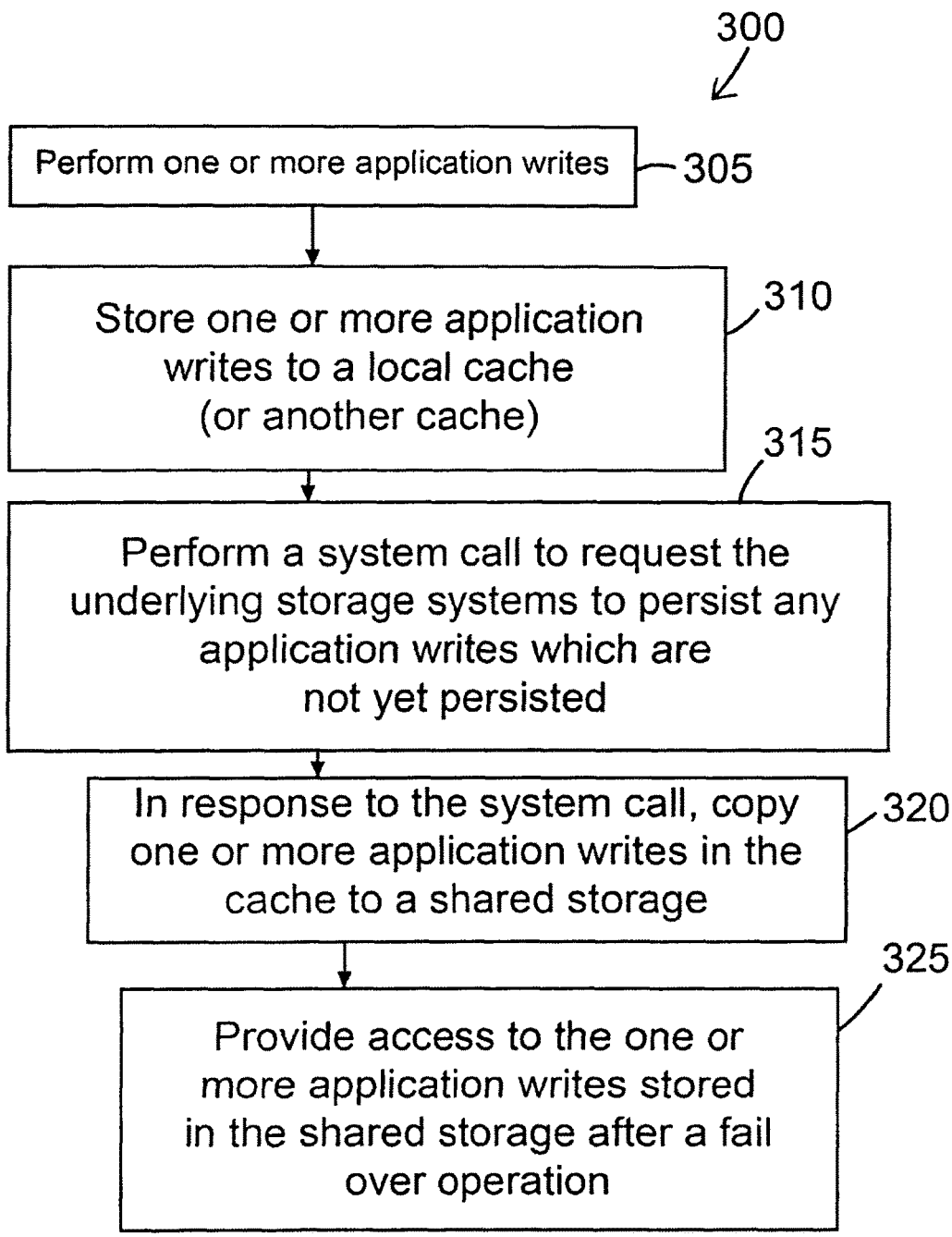
FIG. 3 is a flowchart of a method in accordance with an embodiment of the invention.

FIG. 3 is a flowchart of a method 300 in accordance with an embodiment of the invention. In 305, one or more application writes are performed. For example, an application instance 101 in a first server 104 will perform the one or more application writes 601. The first server 104 is an active server.

In 310, the one or more application writes are stored in a local cache (or another cache). For example, a cache management software 108 in the first server 104 stores (602) one or more application writes 601 to a cache 110.

In 315, a system call is performed to request the underlying storage systems to persist any application writes which are not yet persisted. For example, the application instance 101 performs the system call 603 to the underlying storage systems.

In 320, in response to the system call, the one or more application writes in the cache are copied to a shared storage. For example, in response to the system call 603, the cache management software 108 copies (605) the one or more application writes 601 stored (602) in the cache 110 to the shared storage 103.

In 322, access is provided to the one or more application writes stored in the shared storage after a fail over operation. For example, if one or more components of the first server 104 fails, then a fail over operation will permit a second server 105 to access the one or more application writes 601 stored in the shared storage 103. Therefore, by performing a copy operation (605) of one or more application writes 601 stored (602) in a cache 110, an apparatus and method of accelerating application writes while maintaining high availability in shared storage clusters are provided because the need to perform data replication or other expensive network transfers are advantageously avoided in application consistency operations.

Accordingly, an embodiment of the invention provides a method comprising: performing an application write; storing the application write in a local cache; performing a system call to request an underlying storage system to persist any application writes that are not yet persisted; and in response to the system call, copying the application write in the cache to a shared permanent storage.

In an embodiment of the invention, the method may further comprise: providing access to the application write that is stored in the shared permanent storage after a failover operation.

In another embodiment of the invention, an apparatus comprises: an application configured to perform an application write; a cache software configured to store the application write in a local cache; wherein the application is configured to perform a system call to request an underlying storage system to persist any application writes that are not yet persisted; and in response to the system call, the cache software is configured to copy the application write in the cache to a shared permanent storage.

In yet another embodiment of the invention, the apparatus may further comprise: a storage software configured to provide access to the application write that is stored in the shared permanent storage after a failover operation.

In yet another embodiment of the invention, an article of manufacture, comprises: a non-transient computer-readable medium having stored thereon instructions that permit a method comprising: performing an application write; storing the application write in a local cache; performing a system call to request an underlying storage system to persist any application writes that are not yet persisted; and in response to the system call, copying the application write in the cache to a shared permanent storage.

In yet another embodiment of the invention, the article of manufacture comprises a method, wherein the method further comprises: providing access to the application write that is stored in the shared permanent storage after a failover operation.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   performing, by an application, an application write;
   in response to the application write, intercepting, by a cache management software, the application write and storing, by the cache management software, the application write into a local cache;
   after performing the application write, subsequently performing, by the application, a system call to request an underlying storage system to persist any application writes that are not yet persisted;
   wherein the system call comprises a fsync system call or a fdatasync system call; and
   in response to the system call, copying, by the cache management software, the application write in the local cache to a shared permanent storage so that the application write is stored in the shared permanent storage, wherein the shared permanent storage is shared by a plurality of servers.

2. The method of claim 1, further comprising:
   providing access to the application write that is stored in the shared permanent storage after a failover operation from a first server to a second server, wherein the second server can access the application write after the failover operation.

3. The method of claim 1, wherein the local cache is organized as a transactional log.

4. An apparatus, comprising:
   a server comprising an application configured to perform an application write;
   the server further comprising a cache management software configured to permit the server to intercept the application write and to store the application write into a local cache in response to the application write;
   wherein the application is configured to perform a system call to request an underlying storage system in the server to persist any application writes that are not yet persisted after performing the application write;
   wherein the system call comprises a fsync system call or a fdatasync system call; and
   in response to the system call, the cache management software is configured to permit the server to copy the application write in the local cache to a shared permanent storage so that the application write is stored in the shared permanent storage, wherein the shared permanent storage is shared by a plurality of servers.

5. The apparatus of claim 4, further comprising:
   a storage software configured to provide a second server to access to the application write that is stored in the shared permanent storage after a failover operation from a first server to the second server, wherein the second server can access the application write after the failover operation.

6. The apparatus of claim 4, wherein the local cache is organized as a transactional log.

7. An article of manufacture, comprising:
   a non-transitory computer-readable medium having stored thereon instructions operable to permit an apparatus to:
   perform, by an application an application write;
   in response to the application write, intercept, by a cache management software, the application write and store, by the cache management software, the application write into a local cache;
   after performing the application write, subsequently perform, by the application, a system call to request an underlying storage system to persist any application writes that are not yet persisted;
   wherein the system call comprises a fsync system call or a fdatasync system call; and
   in response to the system call, copy, by the cache management software, the application write in the local cache to a shared permanent storage so that the application write is stored in the shared permanent storage, wherein the shared permanent storage is shared by a plurality of servers.

8. The article of manufacture of claim 7, wherein the instructions are further operable to permit an apparatus to provide access to the application write that is stored in the shared permanent storage after a failover operation from a first server to a second server, wherein the second server can access the application write after the failover operation.

9. The article of manufacture of claim 7, wherein the local cache is organized as a transactional log.

* * * * *